United States Patent [19]

Wörner et al.

[11] Patent Number: 4,906,220
[45] Date of Patent: Mar. 6, 1990

[54] DIVIDED FLYWHEEL

[75] Inventors: Günter Wörner, Kernen; Ernst Tscheplak, Weinstadt; Franz Moser, Wendlingen, all of Fed. Rep. of Germany

[73] Assignee: Daimler-Benz Aktiengesellschaft, Stuttgart, Fed. Rep. of Germany

[21] Appl. No.: 156,446

[22] Filed: Feb. 16, 1988

[30] Foreign Application Priority Data

Feb. 14, 1987 [DE] Fed. Rep. of Germany ....... 3704643

[51] Int. Cl.⁴ .............................................. F16D 3/14
[52] U.S. Cl. ...................................... 464/68; 74/574; 192/106.2; 464/24
[58] Field of Search ....................... 74/574; 192/106.2; 464/24, 64, 66, 68

[56] References Cited

U.S. PATENT DOCUMENTS

| 4,351,167 | 9/1982 | Hanke et al. | 464/68 X |
| 4,662,239 | 5/1987 | Wörner et al. | 192/106.2 X |
| 4,681,199 | 7/1987 | Maucher et al. | 192/48.3 X |
| 4,714,449 | 12/1987 | Woerner et al. | 464/68 |
| 4,739,866 | 4/1988 | Reik et al. | 192/106.2 X |
| 4,788,884 | 12/1988 | Reik et al. | 464/68 X |

FOREIGN PATENT DOCUMENTS

| 2931423 | 2/1980 | Fed. Rep. of Germany . |
| 3610871 | 11/1986 | Fed. Rep. of Germany . |
| 2175067 | 11/1986 | United Kingdom ............. 192/106.2 |

Primary Examiner—Daniel P. Stodola
Attorney, Agent, or Firm—Barnes & Thornburg

[57] ABSTRACT

Divided flywheel arrangements are disclosed with a spring arrangement, and preferably also a slip clutch arrangement, accommodated in a lubricant bath, which is formed by an annular space limited radially outwards only by parts which are stationary relative to one another. Centrifugal forces acting on the lubricant cannot therefore force the lubricant against seals between mutually movable parts. Certain disclosed arrangements do not accommodate these parts in a lubricant bath.

4 Claims, 4 Drawing Sheets

DIVIDED FLYWHEEL

BACKGROUND AND SUMMARY OF THE INVENTION

The invention relates to a divided flywheel with at least two mutually rotatable centrifugal mass elements, which are drive-coupled to each other flexibly by means of a spring arrangement and non-positively by means of a slip clutch arrangement. The spring arrangement has compression springs arranged tangentially to the flywheel axis, which springs are in each case accommodated in windows of at least two mutually rotatable discs connected directly or indirectly to the two centrifugal mass elements.

In the case of such a divided flywheels known from German Published Unexamined Patent Application (DE-OS) 36 10 871, the spring arrangement and the slip clutch arrangement are arranged in series and radially one above the other, the spring arrangement being accommodated radially within the slip clutch arrangement. The flux of force from one to the other centrifugal mass element thus runs successively via the spring arrangement and the slip clutch arrangement or in the reverse direction.

The slip clutch arrangement is of two-stage design, two ring discs being arranged radially one over the other and engaging with each other positively by radial projections and recesses with play in circumferential direction, as its one side connected to the spring arrangement, and a friction surface arrangement arranged on the centrifugal mass element being provided as the other side of the slip clutch arrangement connected to the said centrifugal mass element, which friction surface arrangement interacts non-positively with the ring discs. If, therefore, an adequate torque is transmitted through the spring arrangement firstly the radially inner ring disc connected indirectly to the spring arrangement slips through relative to the friction surface arrangement until the play between the projections and recesses of the two ring discs in circumferential direction is used up. With the same relative direction of movement, now the ring discs can only slip through together with respect to the friction surface arrangement; this of course only happens if a correspondingly increased moment is transmitted via the spring arrangement.

This known divided flywheel is not yet satisfactory with regard to its stability because, in particular, the spring arrangement is highly loaded by the constant relative movements of the centrifugal mass elements. This also applies to such operating phases in which only vibrations of relatively low amplitudes occur in the respective drive train and the relative movements of the centrifugal mass elements have a vibration-similar character.

Therefore, it is an object of the invention to create a divided flywheel which is distinguished to a particular extent by low wear.

This object is achieved according to certain preferred embodiments in that the spring arrangement is arranged within an annular chamber filled with lubricant, which chamber is closed off radially outwards by a wall arrangement, encasing the spring arrangement in a U-shaped manner from radially outside and consisting of parts solidly or integrally interconnected, and radially inwards by a seal arrangement arranged radially within the spring arrangement between mutually rotatable parts.

This arrangement according to the invention ensures a constant lubrication of the spring arrangement and thus an extremely low wear of the same. Since no gaps radially outside the spring arrangement between mutually rotatable parts have to be sealed off, a virtually absolute tightness of the annular chamber is ensured during operation, i.e. with rotating flywheel. Due to the centrifugal forces, the lubricant is namely forced radially outwards against the annular wall arrangement surrounding the spring arrangement in a U-shaped manner. The seal arrangements accommodated radially within the spring arrangement thus essentially only have to prevent an escape of the lubricant when the flywheel is at a standstill.

According to a particularly preferred embodiment of the invention, it is provided that the slip clutch arrangement is also arranged within the annular space filled with lubricant. This achieves a significant increase in the service life of the friction elements.

It is provided in this case in a particularly expedient way that the slip clutch arrangement is of two stage design in the way set out at the beginning and basically known per se. With accommodation within the chamber filled with lubricant, the projections and recesses of the ring discs of the slip clutch arrangement interact in the manner of hydraulic dampers. Each projection of the one ring disc namely divides off within the recess accommodating it or between neighbouring projections of the respective other ring disc seen in axial view of the ring discs two chambers from each other which, depending on the position of the ring discs, have different sizes relative to each other. These chambers are interconnected via a gap, which is formed between the edge of the projection of the one ring disc, facing the respective other ring disc, and the opposite edge of the recess of the other ring disc. Thus, upon movement of the projection of the one ring disc within the recess, hydraulic medium is always displaced on the one side of the projection and fed through the gap to the other side of the projection. This effect is particularly pronounced if the friction surfaces interacting with the ring discs substantially cover or close off the region of the projections and recesses on the front side of the ring discs.

Moreover, the shape of the edge of the recess on the ring disc opposite the projection of the other ring disc may be designed in such a way that the gap width changes upon relative rotation between the ring disc parts. This allows it to be achieved that the higher damping resistance caused by a narrow gap width occurs with certain relative positions of the ring disc parts.

In addition, according to a preferred embodiment of the invention, it is envisaged to arrange as appropriate the friction surface arrangement interacting with the ring discs with at least two friction surface parts arranged radially one above the other corresponding to the ring discs such that in each case one ring disc interacts with only one friction surface part. This gives rise to the possibility of bracing the friction surface parts with different contact pressures against the ring discs, so that the individual stages of the slip clutch arrangement are capable of transmitting different torques.

In particular, there is in this case the possibility of impinging the one friction surface part with a speed-dependent contact pressure in the sense of an increase in the contact pressure upon speed increase.

Other objects, advantages and novel features of the present invention will become apparent from the following detailed description of the invention when considered in conjunction with the accompanying drawings.

DETAILED DESCRIPTION OF THE DRAWINGS

Figure 1:
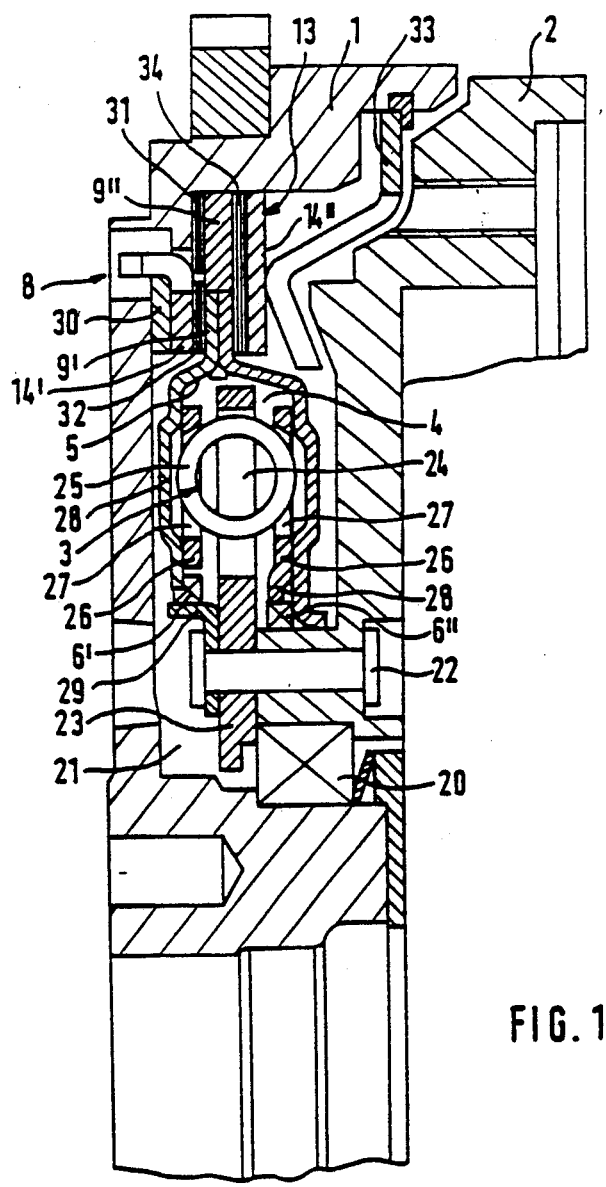
FIG. 1 is a partial schematic axial sectional view of a first embodiment of a divided flywheel constructed according to the invention, with an annular chamber filled with lubricant only surrounding the spring arrangement.

The divided flywheel shown in FIG. 1 has a centrifugal mass element 1, arranged for example on the engine side, and a centrifugal mass element 2, arranged on the side of the drive train and rotatably mounted on a hub region of the centrifugal mass element 1 by means of a bearing 20. The centrifugal mass elements 1 and 2 together surround an annular space 21 remaining between them.

Within the annular space 21 are accommodated a spring arrangement 3 and a slip clutch arrangement 8, which serve the drive-coupling of the centrifugal mass elements 1 and 2 and are arranged in series with each other, i.e. the transmission of a torque takes place from the centrifugal mass element 1 via the slip clutch arrangement 8 and subsequently via the spring arrangement 3 to the centrifugal mass element 2 or vice versa.

As an abutment of the spring arrangement 3, a disc like ring plate 23 is fixed by means of bolts 22 at the hub region of the centrifugal mass element 2. In this arrangement, the radially inner edge of the ring plate 23 overlaps somewhat the bearing shell of the bearing 20 assigned to the centrifugal mass element 2, i.e. the said bearing shell is fixed in the way apparent from the drawing between an annular step on the hub region of the centrifugal mass element 2 and the opposite edge of the ring plate 23. Within the ring plates 23 are arranged several windows 24 which are aligned tangentially to the axis of the fly-wheel and in each case receive a spiral compression spring 25. In this case, the axes of the spiral compression springs 25 fall in the mid-plane of the ring plate 23.

On both sides of the ring plate 23 there is in each case arranged a further ring part 26, which has windows 27 corresponding to the windows 24 of the ring plate 23. In this case, the ring parts 26 are arranged so closely adjacent on the ring plate 23 that the spiral springs 25 are in each case accommodated on both sides of the window 24 of the ring plate 23 in the windows 27 of the ring parts 26.

The ring parts 26 are in each case fixed on mutually facing sides of annular profile parts 28, the insides of which form a wall arrangement 5 surrounding the spring arrangement 3 in U-shaped manner from radially outside. On their radially outer edges, the profile parts 28 are connected solidly and sealingly to each other, forming a ring disc 9'. On their radially inner edges, the profile parts 28 are sealed off by means of seals 6' and 6" from the hub region of the centrifugal mass element 2 or from a ring piece 29 of angular profile, which is fixed on the side of the ring plate 23 facing away from the centrifugal mass element 2, by means of the bolts 22 securing the ring plate 23.

The profile parts 28 surround an annular chamber 4 accommodating the spring arrangement 3 and filled with lubricant.

The ring disc 9' formed by the profile parts 28 has on its outer periphery several projections, not visible in FIG. 1, which are accommodated in corresponding recesses on the inner periphery of a ring disc 9" arranged rotatably in the centrifugal mass element 1, with play in circumferential direction, in such a way that the ring discs 9' and 9" are capable of executing a limited relative rotation with respect to each other.

The ring discs 9' and 9" are axially braced between a friction surface arrangement 13. A first annular friction surface part 14' is arranged on the side of the ring disc 9' facing the centrifugal mass element 1. This friction surface part 14' is a ring piece which is held unrotatably by extensions angled off to the left in FIG. 1 in corresponding recesses on the centrifugal mass element 1, but can be pushed forwards axially against the ring disc 9' by means of a plate spring 30. In this case, the friction surface part 14' lies approximately in a common plane with a ring surface of the centrifugal mass element 1 adjoining the friction surface part 14' radially outwards. Friction discs 31 are arranged between this ring surface of the centrifugal mass element 1 and the ring disc 9", in a corresponding way friction discs 32 lie between the friction surface part 14' and the ring disc 9'. On the side of the ring discs 9' and 9" facing the centrifugal mass element 2 is arranged a friction surface part 14" which covers both ring discs and is secured unrotatably, but axially displaceably on the centrifugal mass element 1 by means of an outer toothing not visible in FIG. 1. The friction surface part 14" is pressed against the ring discs 9' and 9" by means of an annular spring arrangement 33, secured on the centrifugal mass element 1, with corresponding impingement of friction discs 34, which are arranged between the friction surface part 14" and the ring discs 9' and 9".

The contact pressure of the friction surface part 14" is transferred unevenly onto the ring discs 9' and 9". The friction surface part 14' impinged by the plate spring 30 namely attempts to push the ring disc 9' axially to the right in FIG. 1 against the friction surface part 14", so that the loading of the ring disc 9" is reduced somewhat correspondingly by the friction surface part 14".

The annular spring arrangement 33 impinges the friction surface part 14" by means of tongues bent-off obliquely with respect to the friction surface part 14, which tongues bear accordingly upon increased centrifugal forces with a correspondingly increased force against the friction surface part 14" and accordingly increase the contact pressure of the latter on the discs 34 and the ring discs 9' and 9".

The flywheel illustrated acts as follows:

If relatively small torques act between the centrifugal mass elements 1 and the springs 25 of the spring arrangement 3 are tensioned to a greater or lesser extend, corresponding to the degree of the relative rotation between the centrifugal mass elements 1 and 2. Upon greater torques, the ring disc 9' then slips through between the friction surface parts 14' and 14" until the play, which the projections arranged on the outer edge of the ring disc 9' have within the recesses on the inner edge of the ring disc 9" in circumferential direction, is used up. Then, if the torque remains in the same direction, the ring discs 9' and 9" can only rotate together relative to the friction surface parts 14' and 14" and thus relative to the centrifugal mass element 1. This only takes place with correspondingly increased torques, since then all frictional resistances have to be overcome which oppose a relative movement between ring disc 9' and ring disc 9" on the one hand and the centrifugal mass element 1 on the other hand.

As a rule, the divided flywheel is designed in such a way that the slip clutch arrangement 8 only becomes effective with relatively small torques if the resonance frequency of the flywheel is induced.

Figure 2:
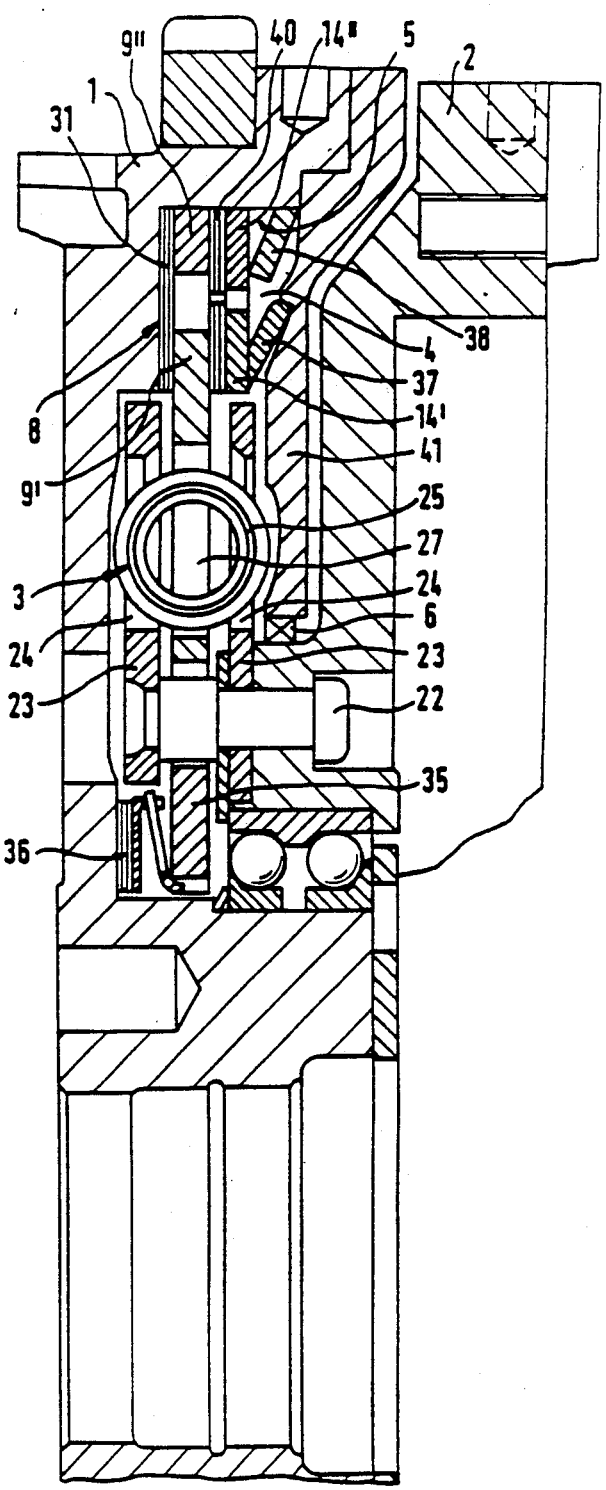
FIG. 2 is a view similar to FIG. 1 showing a modified embodiment in which both the spring arrangement and the slip clutch arrangement are accommodated within an annular chamber filled with lubricant.

In the case of the embodiment illustrated in FIG. 2, two ring plates 23, spaced axially apart, with windows 24 for the spiral springs 25 are fixed on the centrifugal mass element 2 by means of the bolts 22. In addition, a ring piece 35 is also secured fixedly in terms of rotation between the said ring plates 23 by means of the bolts 22, which ring piece is arranged radially within the bolts 22 as a part solidly connected to the centrifugal mass element 2. Between the ring piece 35 and an opposite zone of the centrifugal mass element 1 there is arranged a generally relatively weak slip clutch arrangement 36, which provided for a weak non-positive coupling between the centrifugal mass elements 1 and 2.

In the example of FIG. 2, the ring disc 9' has comparatively large dimensions in radial direction, such that the ring disc 9' reaches with its inner periphery almost up to the bolts 22. In the region of the windows 24 of the ring plate 23, corresponding windows 27 are arranged in the ring disc 9', through which windows the abovementioned spiral springs 25 pass. Accordingly, the ring disc 9' can be rotated against the force of the springs 25 relative to the ring plates 23 and to the centrifugal mass element 2.

Figure 2A:
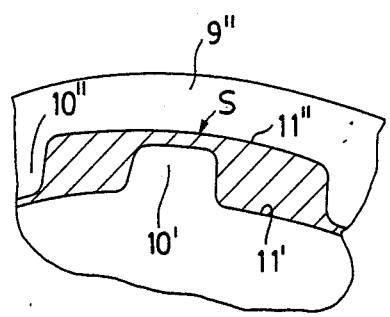
FIG. 2A is a sectional representation of a segment of FIG. 2.

On the outer periphery of the ring disc 9' there are arranged, projections 10' and recesses 11' which interact with corresponding projections 10" and recesses 11" on the inner periphery of the ring disc 9", which is arranged radially above the ring disc 9' ( the sectional representation in FIG. 2A). In the case, the projections 10' of the ring disc 9' have a play in circumferential direction between the projections 10" and within the recesses 11" of the ring disc 9", so that the ring discs 9' and 9" can be rotated to a limited extent relative to each other.

Figure 2B:
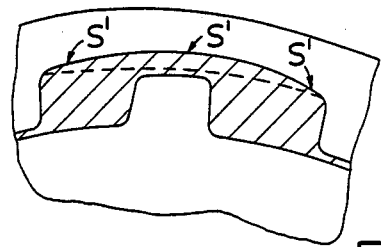
FIGS. 2B and 2C show alternative arrangements for the most motion connection depicted in FIG. 2A.
Figure 2C:
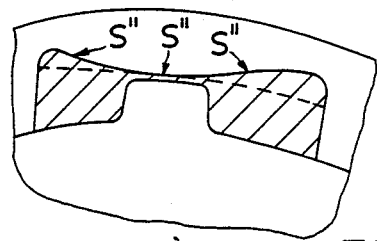

The edges of the recesses 11" of the ring disc 9" opposite the projections 10' of the ring disc 9' may have a shape which deviates from a circular arc with respect to the axis of the ring discs 9' and 9", as is indicated by FIGS. 2A-C which show three space variants for the lost motion connection between the inner and outer discs. FIG. 2 shows a constant spacing S, FIG. 2B shows a spacing S' having a maximum distance at midpoint and a minimum at the ends and FIG. 2C shows a spacing S" having a minimum distance at midpoint and a maximum at the ends. This produces a gap S between the projections 10' and the opposite edge of the recesses 11", the width of which depends on the relative position of the ring discs 9' and 9" with respect to each other.

The purpose of this arrangement is described further below.

As appropriate, the edges of the recesses 11' of the ring disc 9' opposite the projections 10" of the ring disc 9" may also have a corresponding shape.

On the side of the ring disc 9" facing the centrifugal mass element 1 and on the radially outer zone of the ring disc 9' there are arranged friction discs 31, which rest on a friction and support surface arranged on the centrifugal mass element 1.

On the side of the ring disc 9' and 9" facing the circumferential mass element 2 there are arranged annular friction surface parts 14' and 14", which are in each case braced by means of separate plate springs 37 and 38 against the ring disc 9" and the radially outer region of the ring disc 9' or friction discs 40 arranged there.

Unlike the ring discs 9' and 9", the friction surface parts 14' and 14" cannot be rotated relative to the centrifugal mass element 1, only an axial mobility is provided, as in the case of the ring discs 9' and 9". The friction surface part 14" is axially movable by means of projections, arranged on its outer periphery, in assigned axial grooves on the centrifugal mass element 1, but is secured unrotatably. The friction surface part 14' is in turn secured unrotatably, but axially displaceably on the friction surface part 14", mating projections and recesses being arranged on the outer periphery of the friction surface part 14' and on the inner periphery of the friction surface part 14".

On the open side of the centrifugal mass element 1, facing the centrifugal mass element 2, an annular cover plate 41 is fixed, which serves as abutment for the plate springs 37 and 38 and is sealed off at its inner periphery at a hub region of the centrifugal mass element 2 close to the bolts 22 by means of seal 6. The inside of the cover plate 41 forms, together with the insides of the centrifugal mass element 1, a wall arrangement 5 surrounding the spring arrangement 3 and the slip clutch arrangement 8 in U-shaped manner from radially outside, the annular chamber 4 thus formed being filled with lubricant. In the example of FIG. 2, the spring arrangement 3 and the slip clutch arrangement 8 are thus arranged within a lubricant bath. Accordingly, the wear of the spring arrangement 3 and of the slip clutch arrangement 8 is significantly reduced.

The mode of operation of the flywheel illustrated in FIG. 2 corresponds essentially to the mode of operation of the flywheel according to FIG. 1.

If the centrifugal mass elements 1 and 2 are rotated with respect to each other, firstly the spring arrangement 3 is tensioned to a greater or lesser extent. As soon as the torque transmitted by the spring arrangement 3 exceeds a first threshold, the frictional connection between the ring disc 9' and the friction surface part 14' as well as the opposite region of the centrifugal mass element 1 is overcome, i.e. the ring disc 9' slips through and moves relative to the centrifugal mass element 1, until the play in circumferential direction, which is provided by the projections 10' of the ring disc 9' and the projections 10" of the ring disc 9" in the recesses 11' and 11", is used up. Since the entire slip clutch arrangement 8 is arranged within the lubricant bath in the annular chamber 4, the recesses are also filled with lubricant. If the ring discs 9' and 9" then move relative to each other, lubricant is, for example, displaced on the right-hand side of the projection 10' and passed through the gap S to the other side of the projection 10' (see the sectional representation of FIG. 2A). As a result, a hydraulic damping of the relative movements of the ring discs 9' and 9" is achieved. This damping is all the greater the narrower the width of the gap S and the better the region of the projections 10' and 10" and of the recesses 11' and 11" on the ring discs 9' and 9" is covered by the discs 31 and 40 at the front side of the ring discs 9' and 9". Depending on shape of the edge of the recess 11" opposite the projection 10', the gap width changes in dependence on the relative position of the ring discs 9' and 9", so that the damping force also changes correspondingly. In the case of the shape illustrated by the dashed line, the damping increases the further the projection 10' is away from the central position illustrated. In the case of the shape illustrated by dotted lines, the damping is strongest in the central position illustrated.

Figure 3:
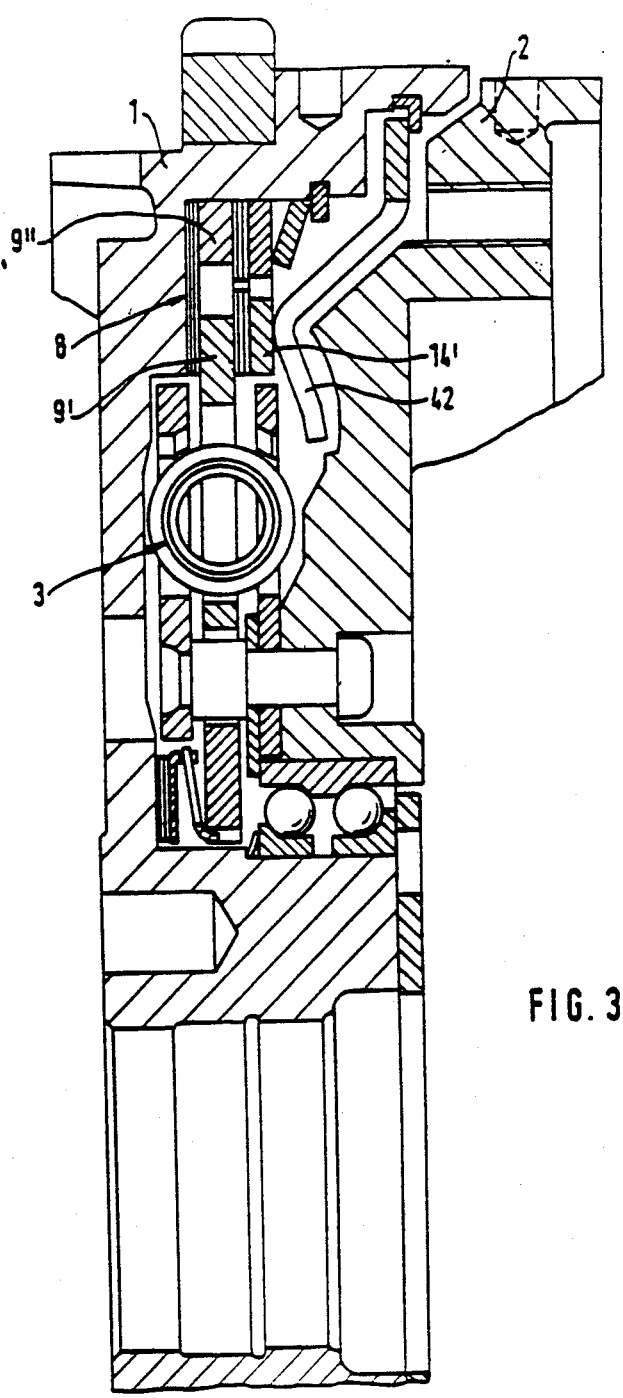
FIG. 3 is a view similar to FIGS. 1 and 2 showing a further embodiment, in which one stage of the slip clutch arrangement of two-stage design is impinged with centrifugal force-dependent contact pressure.

The embodiment illustrated in FIG. 3 differs from that according to FIG. 2 firstly in that neither the spring arrangement 3 nor the slip clutch arrangement 8 is arranged within a lubricant bath. Basically, however, a corresponding arrangement is possible if the shape of the centrifugal mass element 2 is modified in such a way that a part corresponding to the cover plate 41 in FIG. 2 can be arranged on the open side of the centrifugal mass element 1 facing the centrifugal mass element 2.

In addition, the friction surface part 14' is impinged by a spring arrangement 42, which corresponds to the spring arrangement 33 in FIG. 1. Accordingly, the friction surface part 14' is, upon increases speed, forced with increasing pressure in the direction of the ring disc 9'. Accordingly, the ring disc 9' can move relative to the centrifugal mass element 1 only when a correspondingly increased torque is effective between the centrifugal mass elements 1 and 2.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A divided flywheel with at least two mutually rotatable mass elements which are flexibly drive-coupled to one another by a spring arrangement and non-positively by a slip clutch arrangement;

the slip clutch arrangement being connected in series with the spring arrangement;
the spring arrangement having compression springs arranged tangentially to the flywheel axis;
the compression springs being accommodated in windows of three axially aligned discs;
the center disc being non-rotatable with respect to one mass element and attached thereto;
the other two discs being fixedly held at ring-shaped wall parts which tightly enclose the spring arrangement axially and radially on the outside in a U-shape;
the ring-shaped parts having radially inside edges, which define the ends of the U-shape and are connected with sealing means for sealing the ring-shaped parts at a hub area of the one mass element to form an annular chamber enclosing the spring arrangement;
the annular chamber being filled with a lubricant;
a ring disc being arranged at the wall parts and radially outside the annular chamber; and wherein
the ring disc is arranged as part of the slip clutch arrangement, which is located radially between the other mass element and the wall parts outside the annular chamber.

2. Divided flywheel according to claim 1, wherein the slip clutch arrangement is of two-stage design with two ring discs being arranged radially one over the other and engaging with each other positively by radial projections and recesses with play in a circumferential direction and a friction surface arrangement being provided the slip clutch arrangement, which interacts non-positively with the ring discs and wherein the friction surface arrangement has at least two friction surface parts arranged radially one above the other corresponding to the ring disc, such that in each case one ring discs, interacts with only one friction surface part.

3. Divided flywheel according to claim 2, wherein the friction surface parts are braced with different contact pressures against the ring discs.

4. Divided flywheel according to claim 2, wherein the one friction surface part can be impinged with a speed-dependent contact pressure in the sense of an increase in the contact pressure upon speed increase.

* * * * *